(12) United States Patent
Chen et al.

(10) Patent No.: US 10,871,449 B2
(45) Date of Patent: Dec. 22, 2020

(54) SERS SENSOR APPARATUS WITH PASSIVATION FILM

(71) Applicant: Hewlett-Packard Development Company, L.P., Spring, TX (US)

(72) Inventors: Zhizhang Chen, Corvallis, OR (US); Chien-Hua Chen, Corvallis, OR (US); James E Abbott, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 232 days.

(21) Appl. No.: 16/074,368

(22) PCT Filed: Apr. 22, 2016

(86) PCT No.: PCT/US2016/028826
§ 371 (c)(1),
(2) Date: Jul. 31, 2018

(87) PCT Pub. No.: WO2017/184161
PCT Pub. Date: Oct. 26, 2017

(65) Prior Publication Data
US 2020/0158645 A1 May 21, 2020

(51) Int. Cl.
*G01N 21/65* (2006.01)
*G01N 21/05* (2006.01)

(52) U.S. Cl.
CPC ............ *G01N 21/658* (2013.01); *G01N 21/05* (2013.01)

(58) Field of Classification Search
CPC .................... G01N 21/658; G01N 21/05
See application file for complete search history.

(56) References Cited

U.S. PATENT DOCUMENTS

| 8,695,641 | B2 * | 4/2014 | Delamarche ......... B01J 19/0046 137/833 |
| 2010/0129623 | A1 | 5/2010 | Johansson et al. |
| 2010/0284001 | A1 | 11/2010 | Moskovits |
| 2011/0294691 | A1 | 12/2011 | Erickson et al. |
| 2011/0300034 | A1 | 12/2011 | Mair et al. |
| 2011/0316110 | A1 | 12/2011 | Hoenk et al. |
| 2012/0194813 | A1 | 8/2012 | Tzeng et al. |

(Continued)

FOREIGN PATENT DOCUMENTS

| CN | 101501500 | 8/2009 |
| CN | 102706835 | 10/2012 |

(Continued)

OTHER PUBLICATIONS

Xu, Z.; "Surface Enhanced Raman Spectroscopy Based on Black Silver and Micro-pyramids Array"; 2011; https://www.ideals.illinois.edu/bitstream/handle/2142/26129/Xu_Zhida.pdf?sequence=1.

*Primary Examiner* — Hina F Ayub
(74) *Attorney, Agent, or Firm* — Rathe Lindenbaum LLP

(57) ABSTRACT

A method for forming a surface enhanced Raman spectroscopy (SERS) sensing apparatus may include providing a body having an internal microfluidic passage, the microfluidic passage having an interior surrounded by an interior surface, depositing a conformal inorganic passivation film onto the interior surface so as to continuously surround the interior by atomic layer deposition and positioning a SERS sensor in connection with the microfluidic passage after the depositing of the conformal inorganic film.

20 Claims, 12 Drawing Sheets

(56) References Cited

U.S. PATENT DOCUMENTS

| | | | |
|---|---|---|---|
| 2012/0276549 A1 | 11/2012 | Cunningham et al. | |
| 2014/0024131 A1 | 1/2014 | Kim et al. | |
| 2014/0104606 A1* | 4/2014 | Shih | G01N 21/658 |
| | | | 356/301 |
| 2014/0339090 A1* | 11/2014 | Huang | G01N 21/658 |
| | | | 204/603 |
| 2015/0036132 A1 | 2/2015 | Bond et al. | |
| 2015/0355097 A1 | 12/2015 | Zhou et al. | |
| 2016/0033415 A1 | 2/2016 | Meinghart et al. | |
| 2016/0084766 A1 | 3/2016 | Ashok et al. | |
| 2017/0128940 A1* | 5/2017 | Amini | B01F 3/0807 |

FOREIGN PATENT DOCUMENTS

| | | |
|---|---|---|
| CN | 104155282 | 11/2014 |
| CN | 104294236 | 1/2015 |
| CN | 104568894 | 4/2015 |
| CN | 104888874 | 9/2015 |
| CN | 105466905 | 4/2016 |
| CN | 108496071 | 9/2018 |

\* cited by examiner

SERS SENSOR APPARATUS WITH PASSIVATION FILM

BACKGROUND

Surface enhanced Raman spectroscopy (SERS) technology may utilize nano fingers with metal tips to facilitate the sensing of interactions between light impinging an analyte supported by the nano fingers. The sensed interactions may be utilized to identify or analyze the analyte.

BRIEF DESCRIPTION OF THE DRAWINGS

FIG. 78 is a sectional view of the body and microfluidic passage take along line 78-78 of FIG. 7A.

DETAILED DESCRIPTION OF EXAMPLES

Although surface enhanced Raman spectroscopy (SERS) technology offers high sensitivity for molecular level detection, contamination may degrade performance and signal-to-noise ratios. If incorporated as pert of a more integrated device, such as a lab on chip, an SERS substrate may be especially prone to contamination from handling and package outgassing during storage. The present disclosure describes an SERS sensing apparatus and method for forming an SERS sensing apparatus that addresses such contamination concerns.

Figure 1:
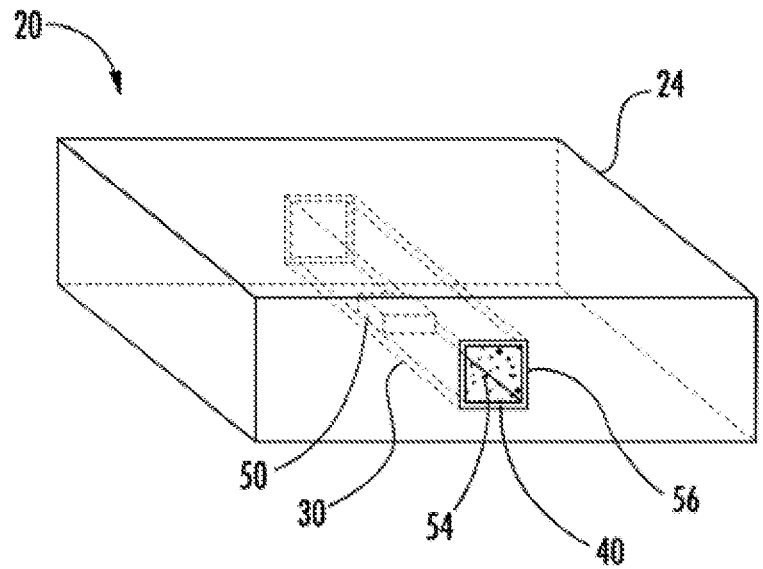
FIG. 1 is a perspective view of an example SERS sensing apparatus.

FIG. 1 schematically illustrates an example SERS sensing apparatus 20. Sensing apparatus 20 addresses contamination concerns by utilizing a conformal passivation film formed by atomic layer deposition. The use of atomic layer deposition results in the conformal inorganic film comprising alternating and stacked, single molecule thick, layers of different molecules resulting from reaction of alternating precursors with the surface being built. The conformal inorganic film, formed by atomic layer deposition, provides a conformal pinhole free passivation coating having a low defect density and a high degree of dielectric strength. This passivation coating provided by the conformal inorganic film reduces or blocks release of contaminants.

The example sensing apparatus 20 comprises body 24, microfluidic passage 30, conformal passivation film 40 and SERS sensor 50. Body 24 comprises a structure in which microfluidic passage 30 extends. Body 24 contains SERS sensor 50. At least portions of body 24 have an opening or are formed from a translucent or transparent material so as to facilitate the transmission of light, such as laser light, through such portions of body 24 into impingement with SERS sensor 50. In one implementation, body 24 comprises an organic transparent material, such as a transparent polymer, or other transparent material which may outgas contaminants to sensor 50 during storage or in response to environmental conditions during testing or use of apparatus 20. In one implementation, body 24 may comprise glass, such as a patterned silicate glass. Because passivation film 40 inhibits or reduces the release of contaminants from the materials upon which coating 40 covers, the design space for the materials of body 24 is enlarged, a greater variety of materials may be utilized without performance degradation of sensor 50 due to contamination.

Microfluidic passage 30 comprises an elongate conduit extending within body 24 that supplies fluid to sensor 50. Microfluidic passage 30 has an interior 54 surrounded by an interior surface 56. For purposes of this disclosure, the term "microfluidic" refers to volumes containing fluids or through such fluid flow, wherein such volumes have at least one dimension in the range of a micrometer or tens of micrometers in smaller. In particular, the term "microfluidic" additionally encompasses such volumes that have at least one dimension smaller than a micrometer.

Although microfluidic passage 30 is illustrated as having a square cross sectional shape and as linearly extending through body 24, in other implementations, microfluidic passage 30 may have a variety of different sizes and shapes. For example, in other implementations, microfluidic passage 30 may have other cross-sectional shapes. In other implementations, microfluidic passage 30 may have a varying cross-sectional size and/or cross sectional shape along its length. In other implementations, microfluidic passage 30 may extend along a nonlinear path, such as a polygonal path, a curved path or serpentine path. In some implementations, microfluidic passage 30, rather than extending fully through body 24, may terminate at a dead end, such as terminating at a closed chamber.

In one implementation, microfluidic passage 30 is formed in body 24 using a material removal process or processes. For example, in one implementation, microfluidic passage 30 may be formed using an etching, drilling or boring process. In another implementation, microfluidic passage 30 may be formed using injection molding process. In yet another implementation, microfluidic passage 30 may be formed by depositing a material about a sacrificial material, wherein the sacrificial material is sacrificed to form microfluidic passage 30. In yet another implementation, microfluidic passage 30 may be printed such as with a three dimensional printer. As will be described hereafter, in other implementations, microfluidic passage 30 may be formed by the joining of a plurality of separate members, wherein at least one of the members has a groove or recess at least partially defining microfluidic passage 30 and wherein the joined members form body 24 with microfluidic passage 30.

Conformal passivation film 40 comprises a layer of a material or multiple materials that form a passivation coating over the interior surface 56 of microfluidic passage 30, wherein the passivation coating blocks or inhibits the release of contaminants from the material, adhesive joining the two members, or materials forming interior surface 56. In one implementation, passivation film 40 may be formed by atomic layer deposition. The use of atomic layer deposition results in the passivation film 40 comprising alternating and stacked, single molecule thick layers of different molecules resulting from reaction of alternating precursors with the ever-changing surface. Passivation film 40, formed by atomic layer deposition, provides a conformal pinhole free passivation coating having a low defect density and a high degree of dielectric strength.

Passivation film 40 continuously surrounds the interior 54 of microfluidic passage 30. In other words, passivation film 40 extends, uninterrupted, continuously about of a centerline of microfluidic passage 30, with no breaks, seams or interruptions. The continuous nature by which film 40 extends about interior 54 and along the length of passage 30 avoids openings or cracks through which contaminants might otherwise be released. In one implementation, passivation film 40 is formed after microfluidic passage 30 has been completed such that any joints or seams along microfluidic passage 30 are covered and seated by passivation film 40. Because passivation film 40 is formed by atomic layer deposition, passivation film 40 reliably conforms to the various shapes, sizes, corners and twists and turns that microfluidic passage 30 might possess. Passivation film 40 provides a more uniform thickness (as compared to other processes such as chemical vapor deposition or sputtering) throughout the length of microfluidic passage 30, from end-to-end, regardless of the length of microfluidic passage 30. Moreover, passivation film 40 may be deposited on difficult to reach surfaces, after microfluidic passage 30 has been completed and substantially enclosed but for inlets and outlets.

In one implementation, passivation film 40 comprises an inorganic material. In one implementation, passivation film 40 comprises at least one material selected from a group of materials consisting of $HfO_2$, $Al_2O_3$, $Ti_2O_3$, $Ta_2O_5$, $SiO_2$, $Si_3N_4$, $ZrO_2$, $Cr_2O_3$, $ZnO$, $SNO$, nitrides such as TiN and TaN, amorphous oxides such as ITO, zinc indium oxis (ZIO), zinc tin oxide (ZTO), indium gallium zinc oxide (IGZO), multicomponent oxides, multicomponent nitrides and transition metal oxides. In one implementation, passivation film 40 has a precisely controlled thickness so as to provide microfluidic passage 30 with a precisely controlled cross-sectional area and precisely controlled flow control. In one implementation, passivation film 40, formed from the multiple single molecule thick layers, has a thickness of up to 20 nm. In one implementation, passivation film 40, formed from the multiple single molecule thick layers, has a thickness of up to 10 um. In yet another implementation, passivation film 40, formed from the multiple single molecule thick layers has an overall thickness of at least 10 Angstroms and less than or equal to 20 Angstroms. Such thicknesses may satisfactorily inhibit the incursion of contaminants into microfluidic passage 30 while, at the same time, not overly constricting fluid flow characteristics of microfluidic passage 30. In yet other implementations, passivation film 40 may be formed from other materials and may have other thicknesses. For example, in some implementations, passivation film 40 may be formed from a single layer or from multiple layers, wherein the layer or each of the multiple layers as a thickness of greater than one molecule.

SERS sensor 50 comprises a device used for sensing the interaction between light and an analyte deposited upon sensor 50 using surface enhanced Raman spectroscopy. Sensor 50 comprises a two dimensional array of deflectable or bendable nano fingers having metal tips. In one implementation, the metal tips may comprise gold, silver or copper. In one implementation, nano fingers comprise polymer pillars, wherein each of the pillars has a metal cap. In other implementations, the pillars of the nano fingers may be formed from other materials. In other implementations, sensor 50 may comprise other SERS sensing structures, other than nano fingers.

Figure 2:
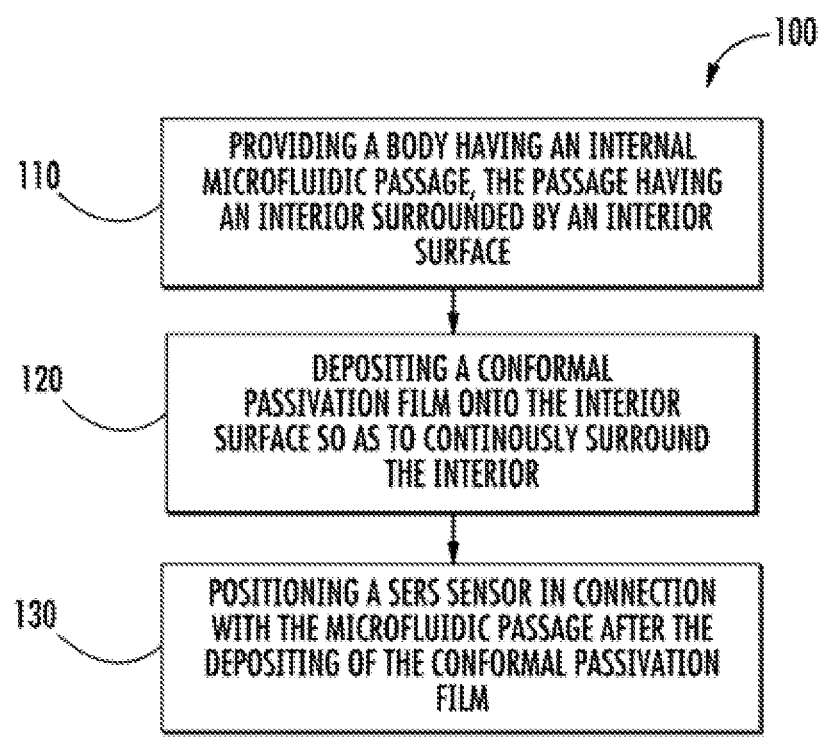
FIG. 2 is a flow diagram of an example method for forming an example SERS sensing apparatus.

FIG. 2 is a flow diagram of an example method 100 that may be utilized to form an SERS sensing apparatus, such as sensing apparatus 20. FIGS. 3A-5C are views illustrating the forming of sensing apparatus 20 according to the example method. Although method 100 is described with respect to the forming of sensing apparatus 20, method 100 may be utilized to form any of the other example SERS sensing apparatus described hereafter as well as other similar SERS sensing apparatus.

Figure 3A:
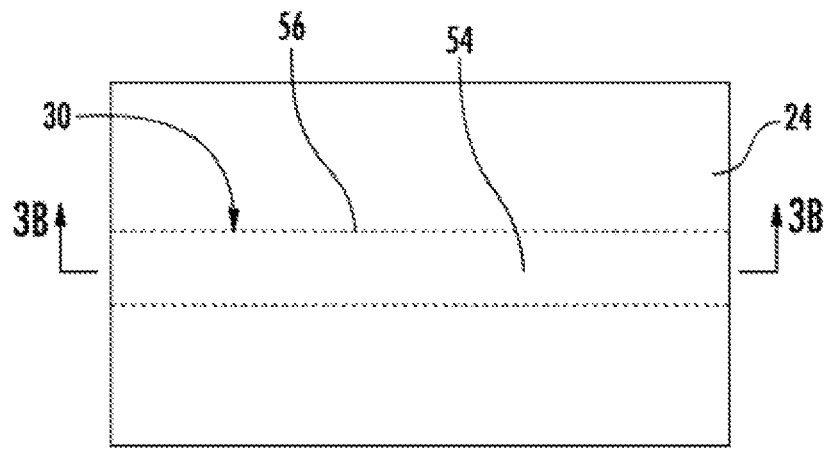
FIG. 3A is a top view of an example body and microfluidic passage for forming the example SERS sensing apparatus of FIG. 1.
Figure 3B:
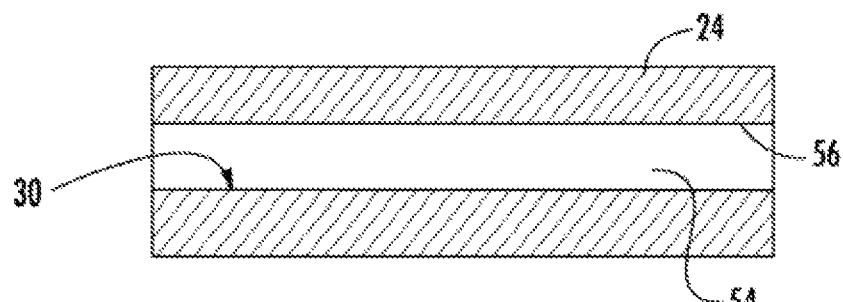
FIG. 3B is a sectional view of the body and microfluidic passage take along line 3B-3B of FIG. 3A.
Figure 3C:
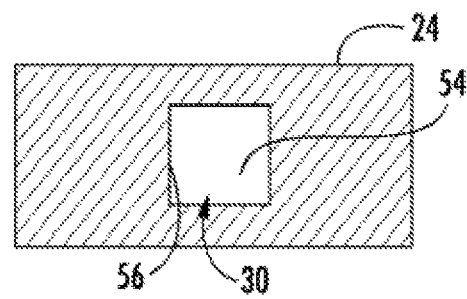
FIG. 3C is an end view of the body and microfluidic passage of FIG. 3A.

As indicated by block 110 in FIG. 2 and illustrated by FIGS. 3A, 38 and 3C, a body 24 having an internal microfluidic passage 30 is provided. Passage 30 has an interior 54 surrounded by an interior surface 56.

Figure 4A:
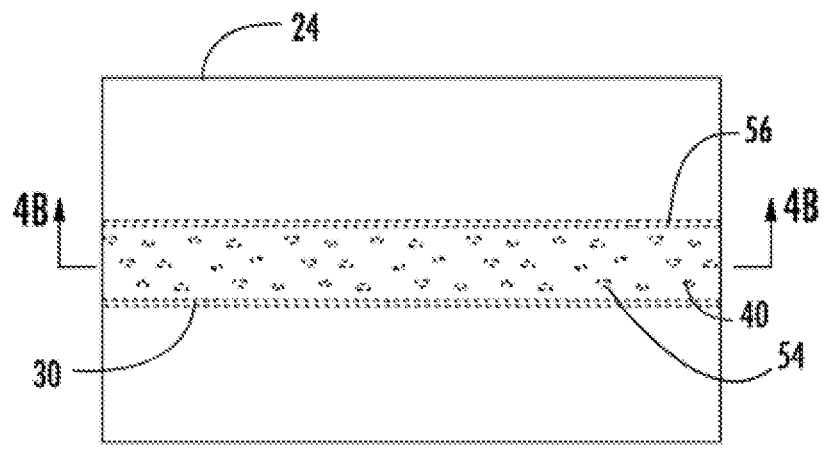
FIG. 4A is a top view of the example body and microfluidic passage of FIG. 3A coated with an example passivation film.
Figure 4B:
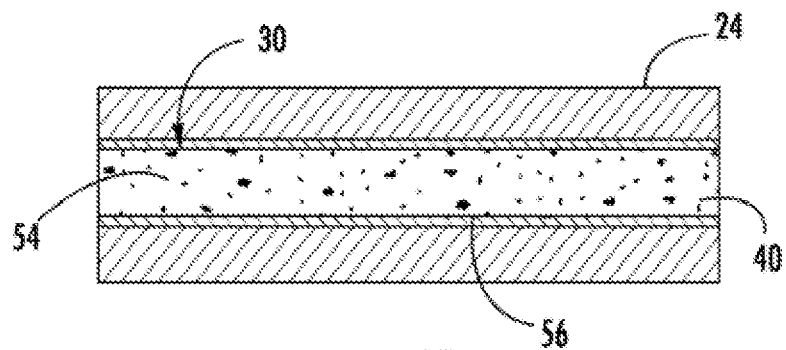
FIG. 4B is a sectional view of the body and microfluidic passage take along line 4B-4B of FIG. 4A, illustrating the microfluidic passage coated with the example passivation film.
Figure 4C:
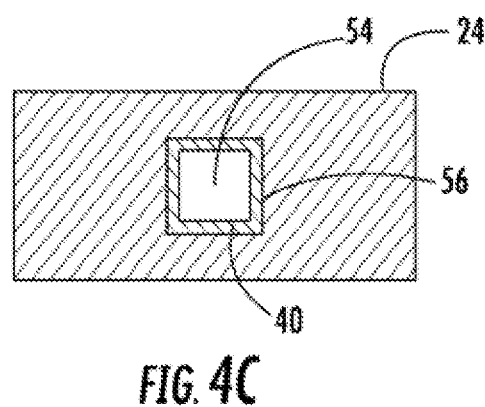
FIG. 4C is an end view of the body and microfluidic passage of FIG. 4A coated with the example passivation film.
Figure 5A:
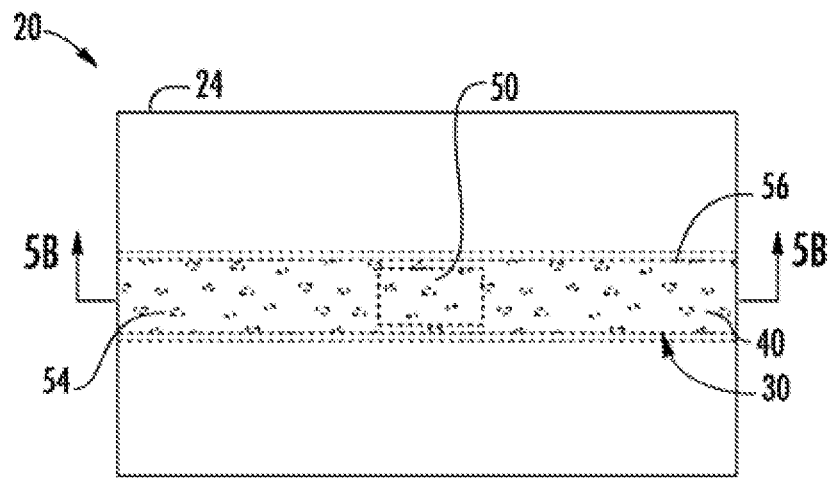
FIG. 5A is a top view of the SERS sensing apparatus of FIG. 1.
Figure 5B:
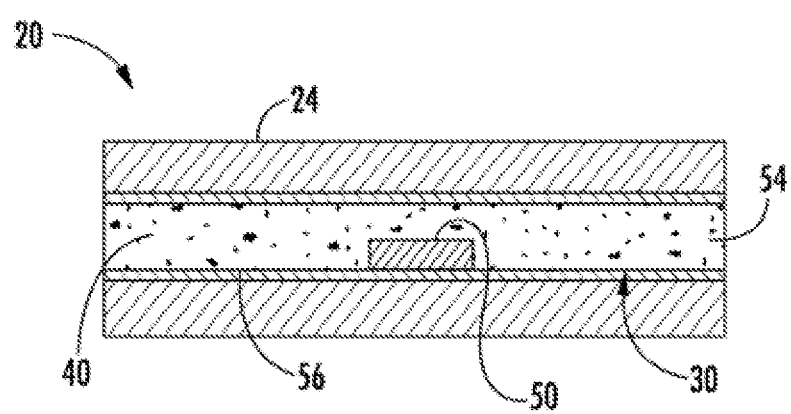
FIG. 5B is a sectional view of the SERS sensing apparatus taken along line 5B-5B of FIG. 5A.
Figure 5C:
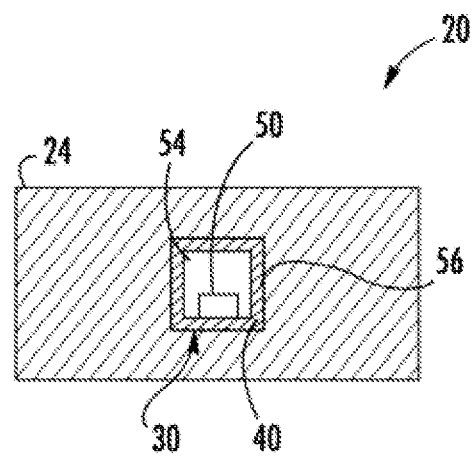
FIG. 5C is an end view of the SERS sensing apparatus of FIG. 1.

As indicated by block 120 in FIG. 2 and illustrated by FIGS. 4A, 48 and 4C, a conformal passivation film 40 is deposited by atomic layer deposition onto the interior surface 56 so as to continuously surround the interior 54. The use of atomic layer deposition results in the passivation film 40 comprising alternating and stacked, single molecule thick layers of different molecules resulting from reaction of alternating precursors with the ever-changing surface.

Passivation film 40 continuously surrounds the interior 54 of microfluidic passage 30. In other words, passivation film 40 extends, uninterrupted, continuously about a center line of microfluidic passage 30, with no breaks, seems or interruption. The continuous nature by which film 40 extends about or encircles interior 54 and along the length of passage 30 avoids openings or cracks through which contaminants might otherwise be released. In one implementation, passivation film 40 is formed after microfluidic passage 30 has been completed such that any joints or seams along microfluidic passage 30 are covered and sealed by passivation film 40. Because passivation film 40 is formed by atomic layer deposition, passivation film 40 reliably conforms to the various shapes, sizes, corners and twists and turns that microfluidic passage 30 might possess. Passivation film 40 provides a more uniform thickness (as compared to other processes such as chemical vapor deposition or sputtering) throughout the length of microfluidic passage 30, from end-to-end, regardless of the length of microfluidic passage 30. Moreover, passivation film 40 may be deposited on difficult to reach surfaces, after microfluidic passage 30 has been completed and substantially enclosed but for inlets and outlets.

In one implementation, passivation film 40 comprises an inorganic material. In one implementation, passivation film 40 comprises at least one material selected from a group of materials consisting of $HfO_2$, $Al_2O_3$, $Ti_2O_3$, $Ta_2O_5$, $SiO_2$, $Si_3N_4$, $ZrO_2$, $Cr_2O_3$, ZnO, SNO, nitrides such as TIN and TaN, amorphous oxides such as ITO, zinc indium oxis (ZIO), zinc tin oxide (ZTO), indium gallium zinc oxide (IGZO), multicomponent oxides, multicomponent nitrides and transition metal oxides. In one implementation, passivation film 40 has a precisely controlled thickness so as to provide microfluidic passage 30 with a precisely controlled cross-sectional area and precisely controlled flow control. In one implementation, passivation film 40, formed from the multiple single molecular thick layers, has an overall thickness of at least 10 Angstroms and less than or equal to 20 Angstroms. Such thicknesses may satisfactorily inhibit the incursion of contaminants into microfluidic passage 30 while, at the same time, not overly constricting fluid flow characteristics of microfluidic passage 30. In yet other implementations, passivation film 40 may be formed from other materials and may have other thicknesses.

As indicated by block 130 in FIG. 2 and illustrated by Figures SA, 58 and 5C, SERS sensor 50 is positioned in connection with microfluidic passage 30 after the conformal passivation film 40 has been deposited, in one implementation, sensor 50 is inserted into microfluidic passage 30 through an inlet or outlet of microfluidic passage 30. In another implementation, sensor 50 is inserted through an opening through body 24 (not shown), wherein the opening is subsequently sealed. In one implementation, the opening through which sensor 50 is inserted is covered by a transparent material to facilitate focusing of light or laser light onto sensor 50. In one implementation, the opening through which sensor 50 is inserted is covered by a lens or a plurality of lenses that focus light or laser light onto sensor 50. In each implementation, sensor 50 is positioned on top of or over the existing, previously formed, passivation film 40. As a result, the passivation film 40 underlying sensor 50 remains to inhibit the release of contaminants that might degrade the performance of sensor 50.

Figure 6:
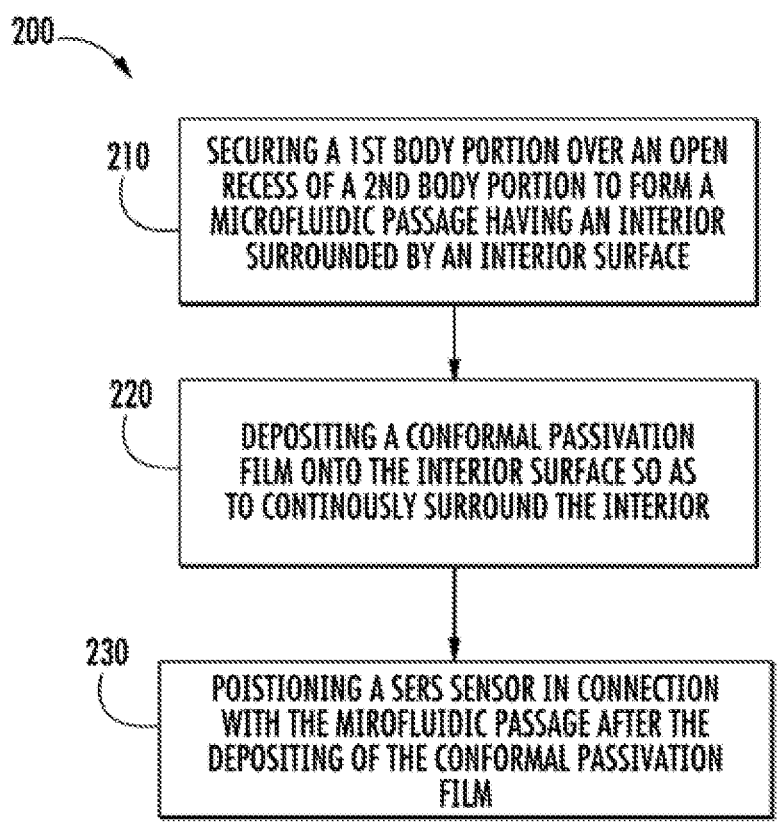
FIG. 6 is a flow diagram of an example method for forming an SERS sensing apparatus.
Figure 8A:
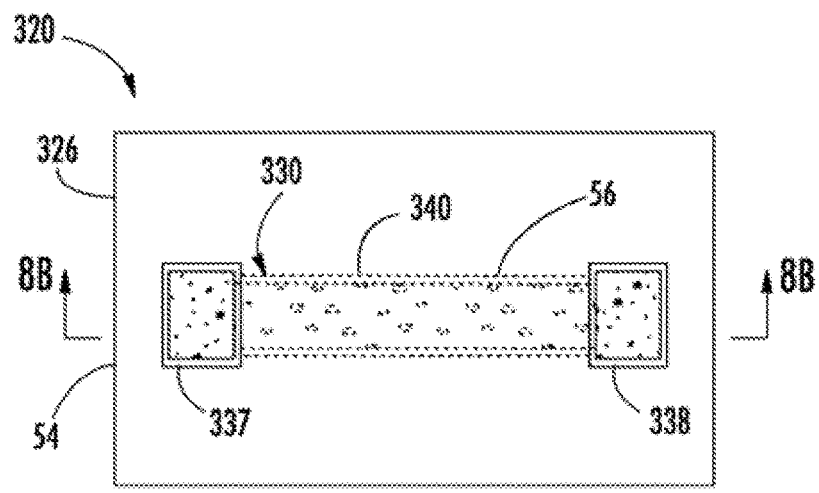
FIG. 8A is a top view of the example body and microfluidic passage of FIG. 8A coated with an example passivation film.
Figure 8B:
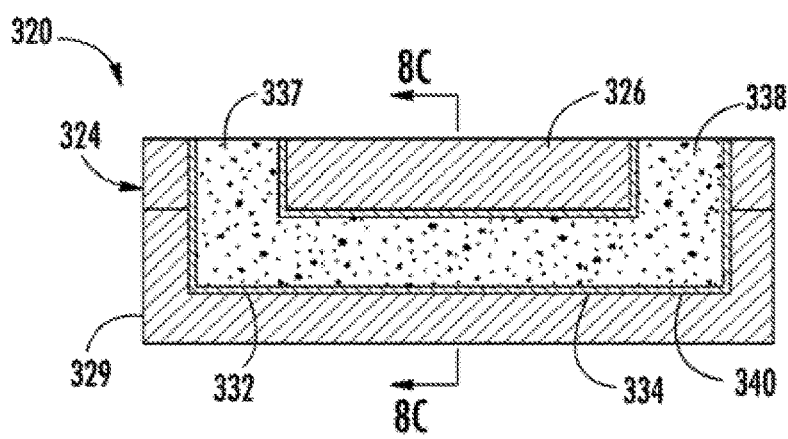
FIG. 8B is a sectional view of the body and microfluidic passage take along line 8B-8B of FIG. 8A, illustrating the microfluidic passage coated with the example passivation film.
Figure 8C:
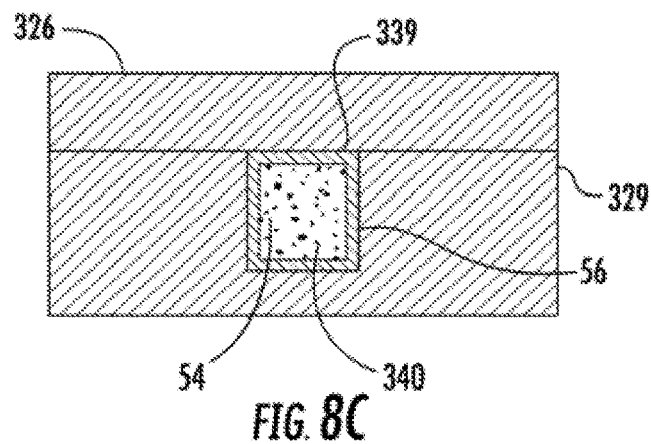
FIG. 8C is a sectional view of the body and microfluidic passage taken along line 8C-8C of FIG. 8B, illustrating the microfluidic passage coated with the example passivation film.
Figure 9A:
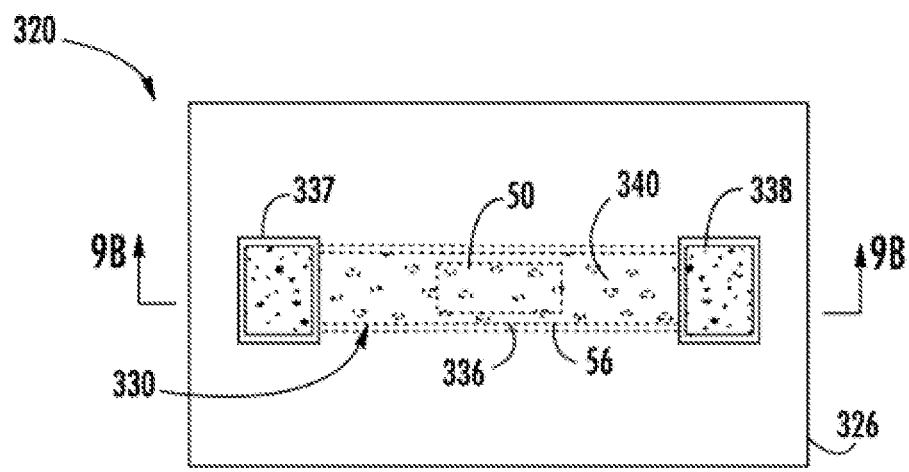
FIG. 9A is a top view of an example SERS sensing apparatus formed from the body and microfluidic passage of FIG. 7A.
Figure 9B:
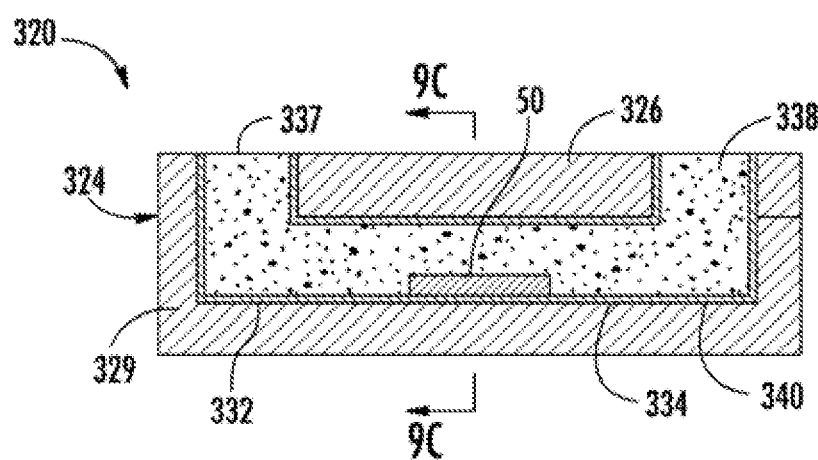
FIG. 9B is a sectional view of the SERS sensing apparatus taken along line 98-98 of FIG. 9A.
Figure 9C:
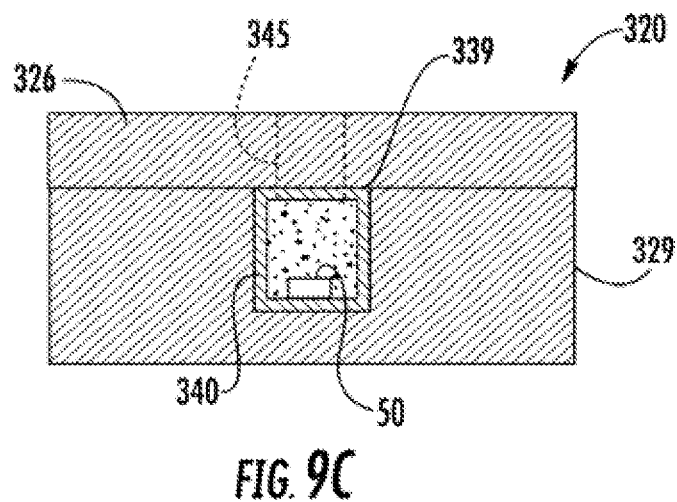
FIG. 9C is a sectional view of the example SERS sensing apparatus taken along line 9C-9C of FIG. 98.

FIG. 6 is a flow diagram of an example method 200 that may be utilized to form an SERS sensing apparatus, such as the example sensing apparatus 320 illustrated in FIGS. 9A, 9B and 9C. FIGS. 7A-9C are views illustrating the forming of sensing apparatus 320 according to the example method. Although method 200 is described with respect to the forming of sensing apparatus 320, method 200 may be utilized to form any of the other example SERS sensing apparatus described herein as well as other similar SERS sensing apparatus.

Figure 7A:
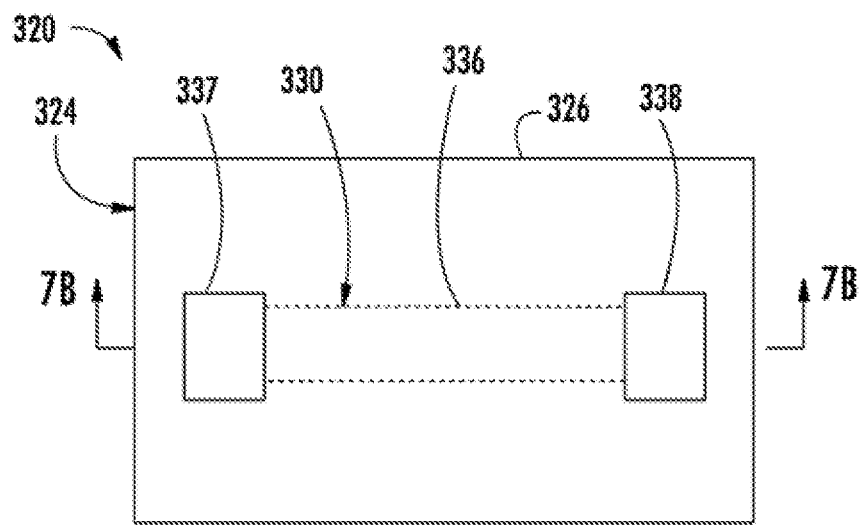
FIG. 7A is a top view of an example body and microfluidic passage for forming an example SERS sensing apparatus.
Figure 7B:
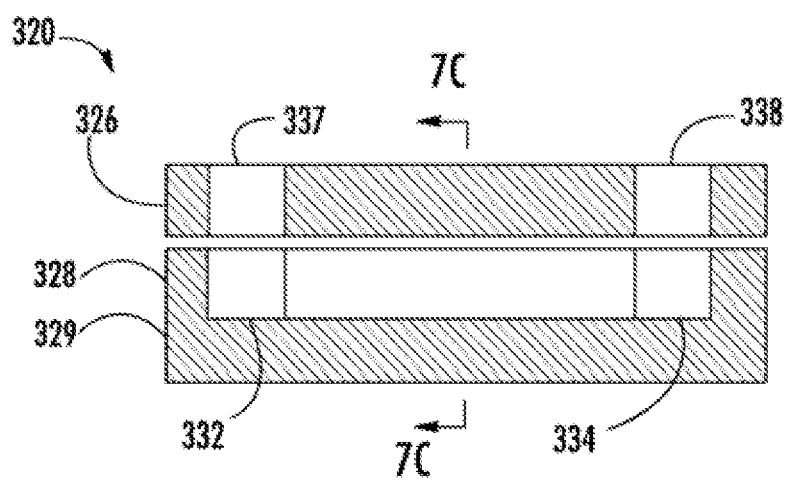
FIG. 7C is a sectional view of the body and microfluidic passage taken along line 7C-7C of FIG. 78.
Figure 7C:
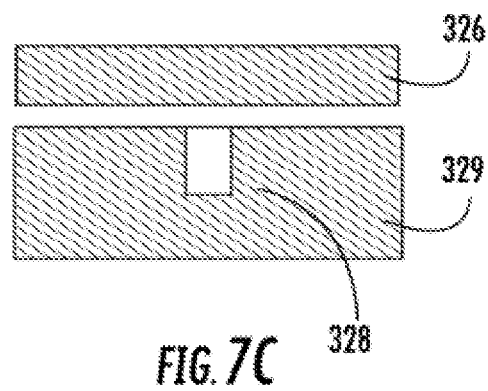

As indicated by block 210 in FIG. 6 and illustrated by FIG. 7A, a body 324 is formed by securing a first body portion 326 over an open groove or recess 328 that extends into a second body portion 329 to form microfluidic passage 330. FIGS. 78 and 7C illustrate body portion 326 prior to being secured to body portion 329, separated from body portion 329. In the example illustrated, recess 328 forms an inlet cavity 332, an outlet cavity 334 and a groove 336 extending between and interconnecting the inlet opening cavity 332 and the outlet cavity 334. As shown by FIG. 78, body portion 326 comprises inlet opening 337 and outlet opening 338.

When joined to body portion 329, first body portion 326 serves as a lid or cover for the open recess 328 of body portion 329 with inlet opening 337 overlying inlet cavity 332 and with outlet opening 338 overlying outlet cavity 334. In the example illustrated, inlet opening 337 and outlet opening 338 have the same shape and align with inlet cavity 332 and outlet cavity 334. In other implementations, inlet opening 337 and outlet opening 338 may have sizes and shapes different than that of inlet cavity 332 and outlet cavity 334, respectively. In the example illustrated, cavity 332, cavity 334 and groove 336 form the floor and sides of microfluidic passage 330 while body portion 326 forms the ceiling or top of microfluidic passage 330. In other implementations, body portion 326 may additionally comprise a recess or groove in alignment with recess 328, such that when body portions 326 and 329 are joined, body portion 326 provides portions of the sides of microfluidic passage 330 in addition to the top of microfluidic passage 330.

As indicated by block 220 in FIG. 6 and illustrated by FIGS. 8A, 8B and 8C, a conformal passivation film 340 is deposited onto the interior surface 56 so as to continuously surround the interior 54 of microfluidic passage 330. In one implementation, film 340 is deposited by atomic layer deposition. Passivation film 340 is the same as passivation film 40 described above except that passivation film 340 fills and seals the seam or junction 339 extending between body portions 326 and 329 along microfluidic passage 330. Passivation film 340 further coats the interior surfaces of inlet opening 337 and outlet opening 338, wherein passivation film 340 continuously extends across the junction of body portion 326 and 329. The continuous nature by which film 340 extends about or encircles interior 54 and along the length of passage 330 avoids openings or cracks through which contaminants might otherwise be released. Because passivation film 340 is formed by atomic layer deposition, passivation film 340 reliably conforms to the various shapes, sizes, corners and twists and turns that microfluidic passage 330 might possess. Passivation film 340 provides a more uniform thickness (as compared to other processes such as chemical vapor deposition or sputtering) throughout the length of microfluidic passage 330, from end-to-end, regardless of the length of microfluidic passage 330. Moreover, passivation film 340 may be deposited on difficult to reach surfaces, after microfluidic passage 330 has been completed and substantially enclosed but for inlets and outlets.

As indicated by block 230 in FIG. 6 and illustrated by FIGS. 9A, 96 and 9C, SERS sensor 50 is positioned in connection with microfluidic passage 330 after the conformal passivation film 340 has been deposited. In one implementation, sensor 50 is inserted into microfluidic passage 330 through and an inlet or outlet of microfluidic passage 330. In another implementation, sensor 50 is inserted through an opening 345 (shown in broken lines in FIG. 9C) through body 324, wherein the opening is subsequently sealed. In one implementation, the opening through which sensor 50 is inserted is covered by a transparent material to facilitate focusing of light or laser tight onto sensor 50. In one implementation, the opening through which sensor 50 is inserted is covered by a lens focuses light or laser light onto sensor 50. In each implementation, sensor 50 is positioned on top of or over the existing, previously formed, passivation film 340. As a result, surfaces about sensor 50 remain sealed by passivation film 340 to inhibit the release of contaminants that might degrade the performance of sensor 50.

Figure 10:
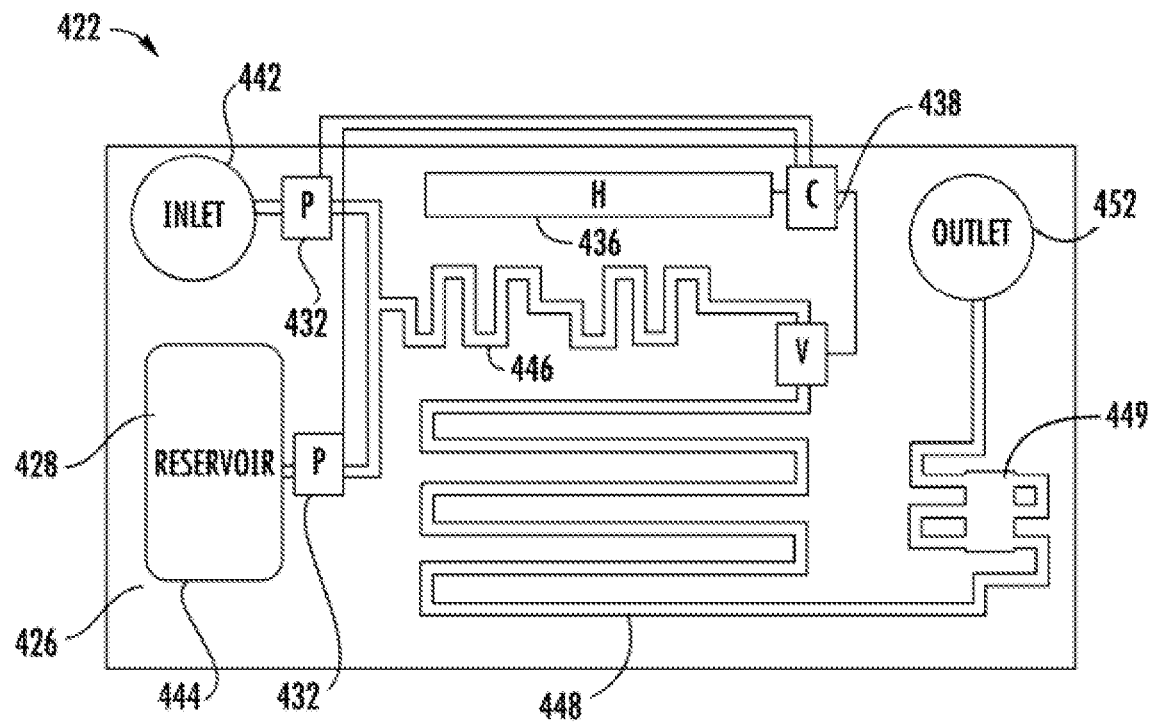
FIG. 10 is a top view of an example microfluidic chip for forming an example SERS sensing apparatus.
Figure 11:
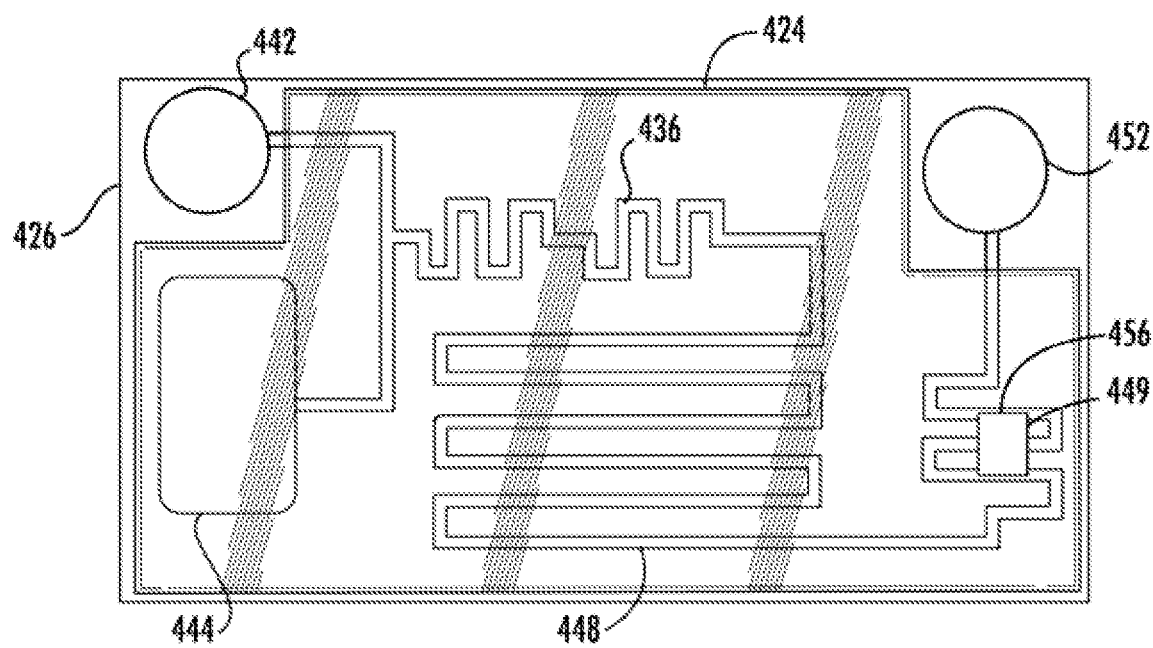
FIG. 11 is a top view of an example microfluidic chip secured to the microfluidic chip of FIG. 10 to form a microfluidic passage.
Figure 15:
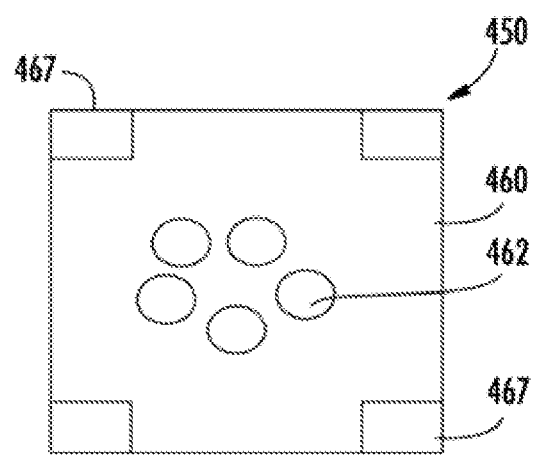
FIG. 15 is a top view of the SERS sensor.
Figure 16:
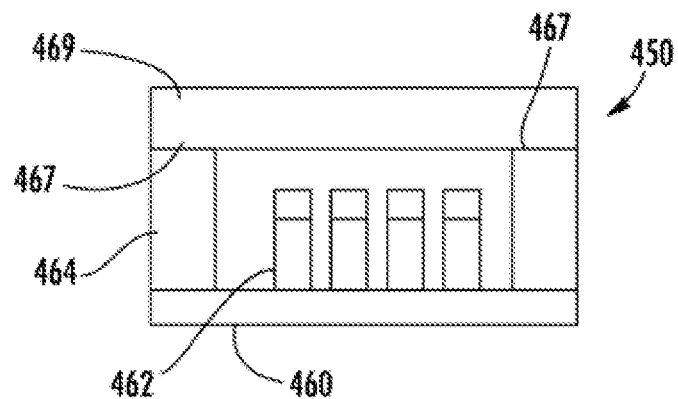
FIG. 16 is a side view of the SERS sensor.
Figure 17:
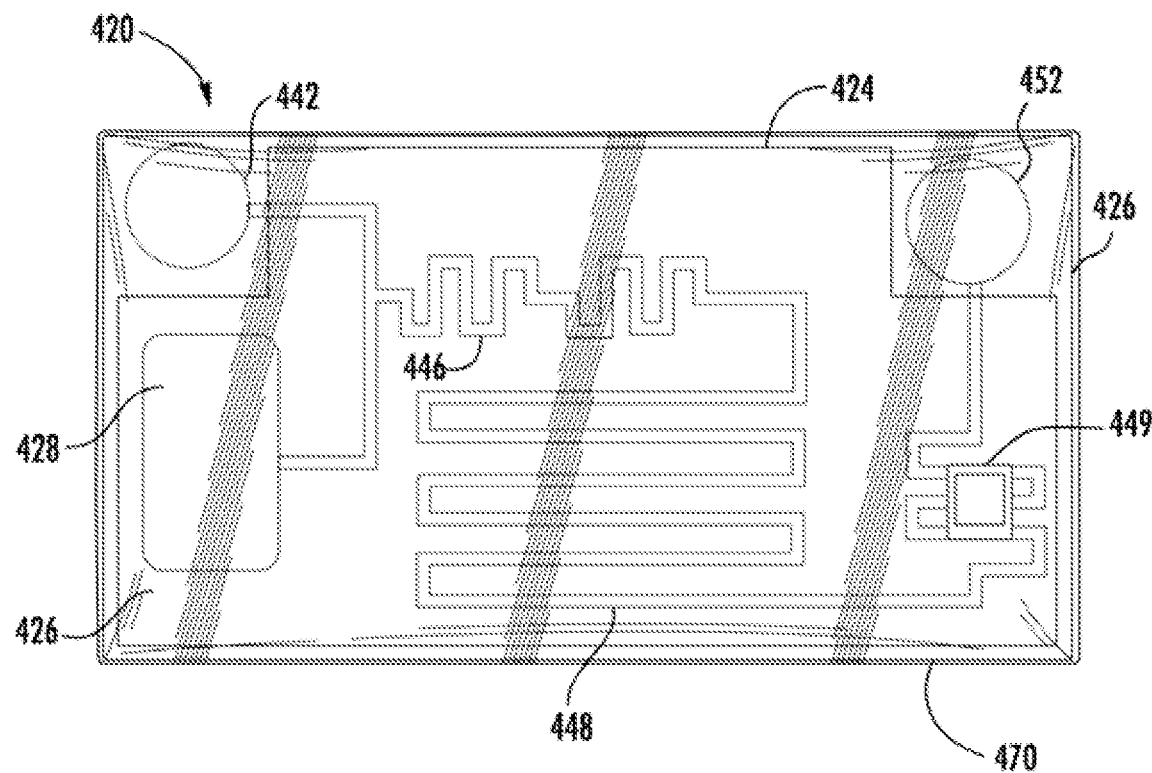
FIG. 17 is a top view of an example package sealing secured over the microfluidic chip, lid and inserted SERS sensor of FIG. 14.

FIG. 17 illustrates an example microfluidic sensing apparatus 420. FIGS. 10-17 illustrate one example method for forming microfluidic sensing apparatus 420. Microfluidic sensing apparatus 420 comprises microfluidic chip 422, lid 424 (shown in FIGS. 11-13), microfluidic passage 430 (shown in FIG. 13-17), conformal passivation film 440 (shown in FIG. 13), surface enhanced Raman spectroscopy (SERS) sensor 450 (shown in FIGS. 13-17) and package sealing 470 (shown in FIG. 17). Microfluidic chip 422 supports electronic componentry of sensing apparatus 420. Microfluidic chip 422 further serves as the lower body portion which cooperates with lid 424 to form microfluidic passage 430. As shown by FIG. 10, microfluidic chip 422 comprises substrate 426, microfluidic recess 428, microfluidic pumps 432, valve 434, heater 436 and controller 438. For purposes of illustration, pumps 432, valve 434, heater 436 and controller 438 are not illustrated in FIGS. 11, 12, 14 and 17.

Substrate 424 comprises a base for the microfluidic chip 422 of sensing apparatus 420. In one implementation, substrate 428 is formed from an organic material, such as a polymer. In another implementation, substrate 428 comprises silicon or a silicon based material. In yet other implementations, substrate 428 may be formed from other materials such as glass. In the case of a glass substrate 428, the conformal passivation film for 40 may inhibit sodium contamination which might otherwise present a significant issue depending on the type of chemistry being analyzed in the chip.

Microfluidic recess 428 is similar to recess 328 described above in that microfluidic recess 428 comprises a groove or channel cut, molded, three-dimensionally printed or otherwise formed, such as through semi-conductor fabrication techniques, in a face of substrate 428. Microfluidic recess 428 forms the floor and sidewalls of a subsequently formed microfluidic passage 430 (shown in FIG. 13). In the example illustrated, microfluidic recess 428 has several distinct shapes and extends along several distinct paths. Microfluidic recess 428 comprises an inlet portion 442, a reservoir portion 444, a mixing and processing portion 446, a separation portion 448, a sensing portion 449 and an outlet portion 452. Inlet portion 442 forms an inlet by which a sample may be deposited for analysis. Reservoir portion 444 forms a portion of a reservoir or chamber to contain an additional liquid for mixing with the sample deposited inlet 442. Mixing and processing portion 446 comprise a serpentine channel in which the mixed liquid resides as it is being processed, such as while the solution is heated by heater 436. Separation portion 446 comprises a serpentine channel that facilitates the separation of particles or analyte of the mixed solution. Sensing portion 449 comprise a serpentine channel that subsequently receives sensor 450. Outlet portion 452 forms an outlet by which a tested solution is discharged. In other implementations, microfluidic recess 428 may have other shapes and proportions depending upon the various microfluidic processes being carried out by microfluidic sensing apparatus 420.

Pumps 432 comprise microfluidic devices integrated into substrate 426 adjacent to microfluidic recess 428 to move liquids through the subsequently completed microfluidic passage 430 (shown in FIG. 13) of sensing apparatus 520. For example, rather than being a separate self-contained unit that is mounted to the substrate or wafer structure, each of pumps 432 is integrated into the materials of the substrate or wafer structure, wherein electric conductive traces or components are sandwiched between or formed as part of multiple fabricated layers of microfluidic chip 422, facilitating smaller scale fabrication of microfluidic chip 422. In one implementation, pumps 432 comprise bubble jet inertial pumps. In yet other implementations, pumps 432 may comprise other pumping devices. In yet other implementations, additional or fewer pumps may be provided at the same or other locations. In some implementations, both of such pumps 432 may be omitted.

Valve 434 comprises a microfluidic device integrated into substrate 426 of microfluidic chip 422 that that selectively opens and closes to regulate the flow of liquid. In the example illustrated, valve 434 is located between processing portion 446 and separation portion 448, wherein valve 434 is controlled to retain liquid within processing portion 446 until ready for separation and portion 448. In other implementations, valve 434 may be provided at other locations or may be omitted.

Heater 436 comprises a device that emits heat along processing portion 446 of microfluidic recess 428. In one implementation, heater 436 comprises one or more electrically conductive resistors that emit heat upon the application of electrical current. In one implementation, such a heater 436 comprises electrically conductive resistors embedded within the layer or layers of material forming substrate 426 of microfluidic chip 422. In one implementation, heaters 436 are utilized to carry out a polymerase chain reaction of the solution within processing portion 446, wherein heater 436 repeatedly applies heat at spaced times to cycle the solution through multiple cycles, such as an initialization step, denaturation step, annealing step and an extension/elongation step. In other implementations, heater 436 may apply heat for other purposes. In still other implementations, heater 436 may be provided at other locations to apply heat to other portions of liquid within other portions of microfluidic channel 430 or may be omitted.

Controller 438 comprises a processing unit that controls the operation of pumps 432, belt 434 and heater 436. In one implementation, controller 438 further receives signals from sensor 450. In one implementation, controller 438 is integrated into or as part of substrate 426. In one implementation, controller 438 further facilitates the transmission of signals or data to external or remote devices by electrical contact pad or other connector.

In other implementations, in lieu of being integrated into or partially surrounded by portions or layers of substrate 426 of microfluidic chip 422, pumps 432, valve 434, heater 436 and/or controller 438 may be positioned in place on top of substrate 426. In still other implementations, such microfluidic components or micro-elecromechanical system (MEMs) devices may be formed on the underside of lid 424 and positioned in place when lid 424 is joined to the face of microfluidic chip 422.

Figure 12:
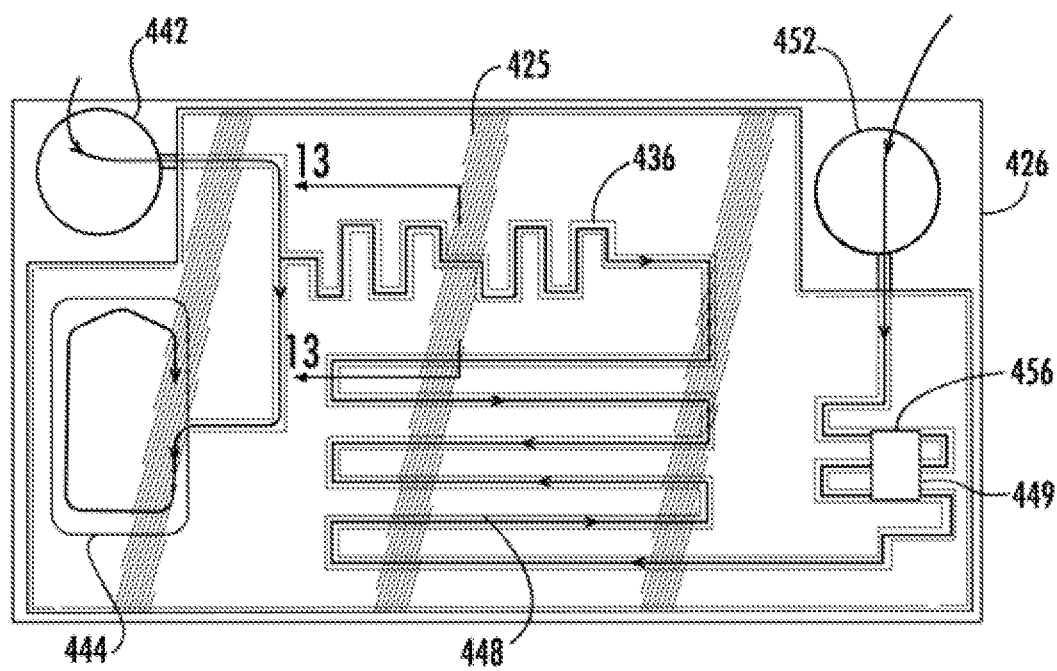
FIG. 12 is a top view of the microfluidic chip and lid of FIG. 11 further illustrating the application of an example conformal passivation film to the microfluidic passage.
Figure 13:
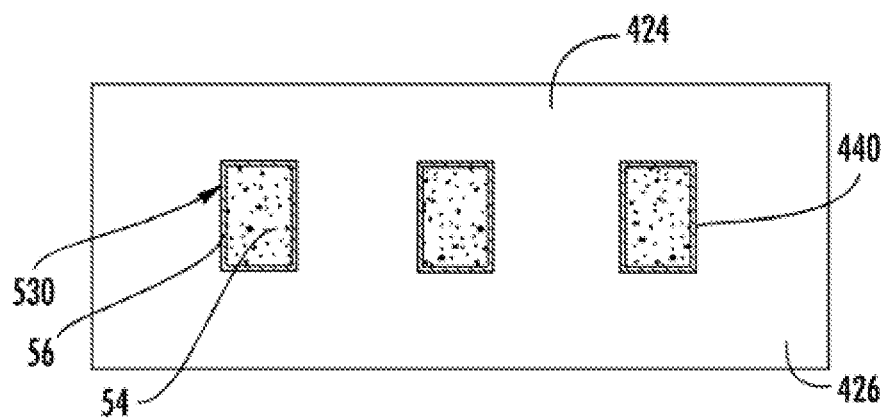
FIG. 13 is a sectional view of the microfluidic chip and lid taken along line 13-13 of FIG. 12 after application of the conformal passivation film.

Lid 424 (shown in FIGS. 11-13) comprises a panel, sheet, film or other structure joined to microfluidic chip 422 so as to cover portions 444, 448, 448 and 449 of microfluidic recess 428 and form the completed microfluidic passage 430 (shown in FIG. 13). In the example illustrated, microfluidic recess 428 forms the floor and sides of microfluidic passage 430 while lid 424 forms a top or ceiling of microfluidic passage 430. In one implementation, lid 424 is joined to substrate 426 of microfluidic chip 422 by adhesive. In another implementation, lid 424 is joined to substrate 426 by fusing, welding or other securement mechanisms.

In the example illustrated, lid 424 comprises an opening or window 456 that extends over sensing portion 449 of microfluidic recess 428. Window 456 facilitates subsequent insertion of sensor 450 into sensing portion 449. In some implementations, window 458 further facilitates the provision of a transparent material or lens opposite to sensor 450 within sensing portion 459. In one implementation, lid 429 is opaque but for window 456. In yet another implementation, other portions of lid 424 are transparent. In one implementation, lid 424 has a thickness of at least 0.5 mm and no greater than 3 mm. In other implementations, lid 424 may have other thicknesses. Examples of materials, from which lid 424 may be formed include, but are not limited to, cyclo-olefin polymer, acrylic, polycarbonate, and the like.

Conformal passivation film 440 is similar to conformal passivation film 340 described above. Passivation film 440 comprises material or materials that impede or block the passage of contaminants with respect to sensor 450 and that may be deposited by atomic layer deposition. In one implementation, passivation film 440 comprises an inorganic material. In one implementation, passivation film 440 comprises at least one material selected from a group of materials consisting of $HfO_2$, $Al_2O_3$, $Ti_2O_3$, $Ta_2O_5$, $SiO_2$, $Si_3N_4$, $ZrO_2$, $Cr_2O_3$, ZnO, SNO, nitrides such as TiN and TaN, amorphous oxides such as ITO, zinc indium oxide (ZIO), zinc tin oxide (ZTO), indium gallium zinc oxide (IGZO), multicomponent oxides, multicomponent nitrides and transition metal oxides.

As shown by FIG. 12, passivation film 440 is formed by alternately exposing the interior of microfluidic passage 430 to gaseous species or precursors which enter microfluidic passage 430 through opening such as inlet portion 442 and outlet portion 452. During such time, window 456 is covered or sealed, such as by a panel of removable tape, which is removed after the formation of film 440, prior to the securement of package ceiling 470. In particular, after microfluidic passage 430 has been exposed to a first precursor, forming a first single molecule thick layer on the interior surface of microfluidic passage 430, the first precursor is cleared or discharged from microfluidic passage 430. Following the discharge of the first precursor from microfluidic passage 430, the interior of microfluidic passage 430 is exposed to a second different precursor which reacts with the first layer formed by the first precursor to form a second single molecule thick layer, stacked on the first layer. This process is repeated until passivation film 440 has a desire thickness.

In one implementation, passivation film 440 has an overall thickness form by the layer or multiple layers of at least 10 Angstroms and less than or equal to 20 Angstroms. Such thicknesses may satisfactorily inhibit the incursion of contaminants into microfluidic passage 430 while, at the same time, not overly constricting fluid flow characteristics of microfluidic passage 430. Such thicknesses may further provide passivation film 440 with a degree of flexibility to inhibit cracking or breakage. In yet other implementations, passivation film 440 may be formed from other materials and may have other thicknesses.

As shown by FIG. 13, passivation film 440 continuously surrounds the interior 54 of microfluidic passage 430, continuously coating interior surface 56 of microfluidic passage 430. In other words, passivation film 440 extends, uninterrupted, continuously about a center line of microfluidic passage 430, with no breaks, seams or interruption. The continuous nature by which film 440 extends about or encircles interior 54 and along the length of passage 430 avoids openings or cracks through which contaminants might otherwise be released. In the example illustrated, passivation film 440 is formed after microfluidic passage 30 has been completed by the joining of chip 422 to lid 424 such that any joints or seams along microfluidic passage 430 are covered and sealed by passivation film 440. Because passivation film 440 is formed by atomic layer deposition, passivation film 440 reliably conforms to the various shapes, sizes, corners and twists and turns of microfluidic passage 430. Passivation film 440 provides a more uniform thickness (as compared to other processes such as chemical vapor deposition or sputtering) throughout the length of microfluidic passage 430, from end-to-end, regardless of the length of microfluidic passage 430. Moreover, passivation film 440 may be deposited on difficult to reach surfaces, after microfluidic passage 430 has been completed and substantially enclosed but for inlet 442 and outlet 452.

SERS sensor 450 comprises a device used for sensing the interaction between light and an analyte deposited upon sensor 450 using surface enhanced Raman spectroscopy. As shown by FIGS. 15 and 16, sensor 450 comprises substrate 460, nano fingers 462 and mesas 464. Substrate 450 comprises a base from which nano fingers 462 and mesas 464 project. In one implementation, substrate 450 is formed from silicon. In another implementation, substrate 450 is formed from a polymer. In one implementation, the polymer material from wood substrate 450 is formed may be coated with an inorganic contaminant blocking material or film.

Nano fingers 462 comprise a two dimensional array of rods, wires or other columns rising up from substrate 460. Each nano fingers 462 comprises a bendable pillar supporting a metal tip. In one implementation, each metal tip is formed from material that enhances SERS sensitivity, such as gold or silver. In one implementation, the pillar comprises a flexible bendable polymer that is coated with an inorganic film to inhibit contaminants from being released from the surface of the polymer pillar.

Mesas 464 comprise posts or columns projecting from substrate 460 beyond nano fingers 462. In one implementation, mesas 464 are formed from an inorganic material, such as silicon or a silicon based material. In another implementation, mesas 464 are formed from a polymer material. In one implementation, mesas 464 are formed from a polymer material having an outer surface that is coated with an inorganic or other contaminant blocking film.

In one implementation, mesas 464 have upper surfaces 467 that contact package sealing 470 above nano fingers 462. In yet another implementation, as indicated by broken lines in FIG. 16, mesas 487 support an optical lens 469 above nano fingers 462. In one implementation, optical lens

Figure 14:
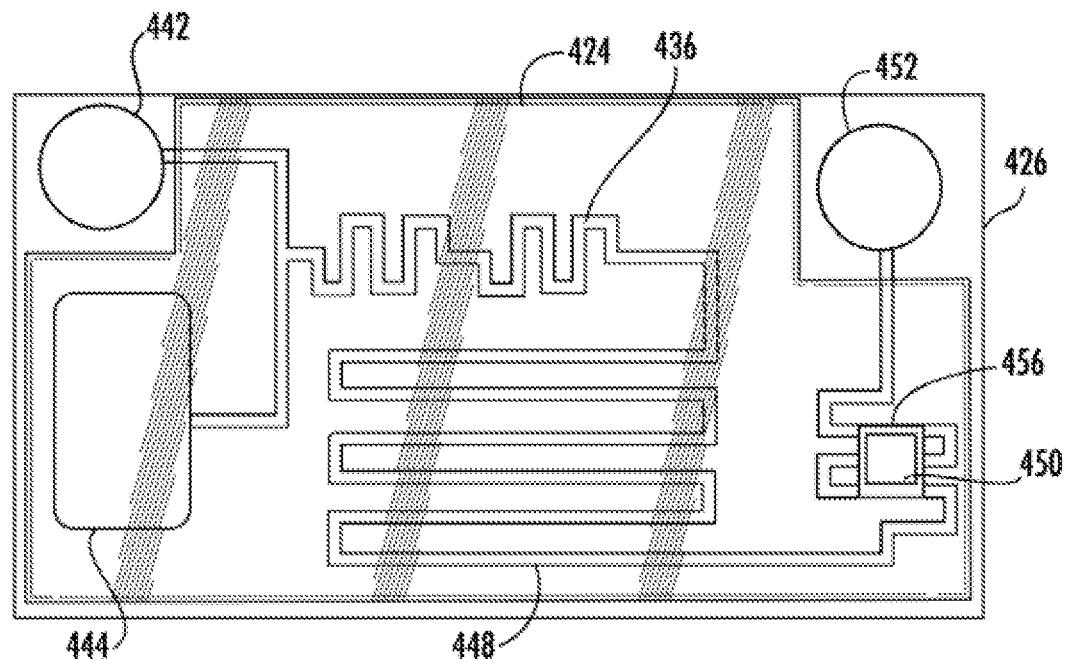
FIG. 14 is a top view of the microfluidic chip and lid of FIG. 13 with an inserted SERS sensor.

469 is alternatively mounted to lid 424 across opening 456 after the insertion of sensor four 550 through opening 456. In other implementations, mesas 464 facilitate handling of sensor 450 when sensor 450 is passed through opening 456 into sensing portion 449 of microfluidic passage 430 as shown in FIG. 14. In some implementations, mesas 464 may be omitted.

Package sealing 470 comprises a structure, film or layer removably or releasably secured over lid 424 and over opening 456. Package sealing 470 covers and seals opening 456 as well as inlet 442 and outlet 452 during storage, ready for use. In one implementation, package sealing 470 is to be removed or peeled away from lid 424, allowing samples to be deposited through inlet portion 442 and discharge outlet portion 452 while also allowing sensor 450 (and the analyte deposited upon nano fingers 462) to be impinged by laser light or other light through window 456. In one implementation, package sealing 470 comprises a panel or film of a material such as an aluminum-coated plastic film releasably adhered to lid 424 by thermal compression bonding. In other implementations, package sealing 470 may be smaller, covering just inlet portion 442 and outlet portion 452.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A method for forming a surface enhanced Raman spectroscopy (SERS) sensing apparatus, the method comprising:
   providing a body having an internal microfluidic passage, the microfluidic passage having an interior surrounded by an interior surface;
   depositing a conformal inorganic passivation film onto the interior surface so as to continuously surround the interior; and
   positioning a SERS sensor in connection with the microfluidic passage after the depositing of the conformal inorganic film.

2. The method of claim 1, wherein providing the body comprises:
   forming a first body portion, the first body portion comprising a groove; and
   securing a second body portion to the first body portion over the groove to cover the groove, wherein the first body portion and the second body portion form the interior surface of the microfluidic passage, wherein the conformal inorganic passivation film continuously extends across a junction of the first body portion and the second body portion.

3. The method of claim 1, wherein providing the body comprises three dimensionally printing the body with the internal microfluidic passage.

4. The method of claim 1, wherein the conformal inorganic passivation film comprises multiple layers having a collective thickness of at least 10 Angstroms and less than or equal to 20 Angstroms.

5. The method of claim 1, wherein the conformal inorganic passivation film is deposited by atomic layer deposition (ALD).

6. The method of claim 1, wherein the positioning of the SERS sensor comprises passing the SERS sensor through an opening in the body into the body and into connection with the microfluidic passage.

7. The method of claim 6 further comprising securing a lens across the opening after the positioning of the SERS sensor in connection with the microfluidic passage.

8. The method of claim 1, wherein the microfluidic passage extends between a fluid reservoir, having a dimension different than a corresponding dimension of the microfluidic passage and an interior with an interior surface, and the SERS sensor and wherein the conformal inorganic passivation film is deposited so as to continuously cover the interior surface of the fluid reservoir and to continuously extend from the fluid reservoir to the SERS sensor.

9. The method of claim 1, wherein the body comprises an inlet and an outlet in connection with the microfluidic passage, wherein the SERS sensor is positioned between the inlet and the outlet and wherein the conformal inorganic passivation film is deposited so as to extend on the interior surface of the microfluidic passage continuously from the inlet to the outlet.

10. A surface enhanced Raman spectroscopy (SERS) sensing apparatus comprising:
    a body;
    a SERS sensor within the body;
    a microfluidic passage extending within the body to supply fluid to the sensor, the microfluidic passage having an interior surrounded by an interior surface;
    a conformal inorganic film on the interior surface of the microfluidic passage and continuously extending about the interior of the microfluidic passage.

11. The SERS sensing apparatus of claim 10, wherein the microfluidic passage is serpentine.

12. The SERS sensing apparatus of claim 10, wherein the SERS sensor is positioned on top of the conformal inorganic film.

13. The SERS sensing apparatus of claim 10, wherein the body comprises at least one of a polymer and a glass.

14. The SERS sensing apparatus of claim 10, wherein the body comprises an inlet and an outlet in connection with the microfluidic passage, wherein the SERS sensor is positioned between the inlet and the outlet and wherein the conformal inorganic passivation film extends on the interior surface of the microfluidic passage continuously from the inlet to the outlet.

15. The SERS sensing apparatus of claim 10, wherein the conformal inorganic passivation film comprises multiple layers having a collective thickness of at least 10 Angstroms and less than or equal to 20 Angstroms.

16. The SERS sensing apparatus of claim 15, wherein the body comprises:
    a first body portion, the first body portion comprising a groove; and a second body portion to the first body portion over the groove to cover the groove, wherein the first body portion and the second body portion form the interior surface of the microfluidic passage, wherein the conformal inorganic passivation film continuously extends across a junction of the first body portion and the second body portion.

17. The SERS sensing apparatus of claim 10, wherein the conformal inorganic film comprises at least one material selected from a group of materials consisting of $HfO_2$, $Al_2O_3$, $Ti_2O_3$, $Ta_2O_5$, $SiO_2$, $Si_3N_4$, $ZrO_2$, $Cr_2O_3$, ZnO, SNO, TiN and TaN, ITO, zinc indium oxis (ZIO), zinc tin oxide (ZTO), indium gallium zinc oxide (IGZO), multicomponent oxides, multicomponent nitrides and transition metal oxides.

18. The SERS sensing apparatus of claim 10, wherein the conformal inorganic film comprises multiple single molecule thick layers.

19. The SERS sensing apparatus of claim 10, wherein the conformal inorganic film is directly coated upon the interior surface.

20. A surface enhanced Raman spectroscopy (SERS) sensing apparatus comprising:
- a first body portion comprising:
  - an inlet cavity;
  - an outlet cavity;
  - a groove extending between and interconnecting the inlet cavity and the outlet cavity;
- a second body portion secured to the first body portion so as to cover the groove;
- a conformal inorganic film continuously extending from the inlet cavity to the outlet cavity and continuously extending across a junction of the first body portion and the second body portion; and
- a SERS sensor on top of the conformal inorganic film.

* * * * *